United States Patent [19]

Hostetler

[11] Patent Number: 4,709,658
[45] Date of Patent: Dec. 1, 1987

[54] CAGE ANCHOR FOR WATERING DEVICE

[75] Inventor: Eldon Hostetler, Middlebury, Ind.

[73] Assignee: Ziggity Systems, Inc., Middlebury, Ind.

[21] Appl. No.: 688,722

[22] Filed: Jan. 4, 1985

[51] Int. Cl.⁴ .............................................. A01K 31/00
[52] U.S. Cl. ......................................... 119/18; 119/75
[58] Field of Search ................... 119/18, 72, 72.5, 75, 119/26

[56] References Cited

U.S. PATENT DOCUMENTS

| | | | |
|---|---|---|---|
| D. 150,917 | 9/1948 | Berg. | |
| D. 177,053 | 3/1956 | Kofford. | |
| D. 222,271 | 10/1971 | Radar. | |
| D. 234,145 | 1/1975 | Peppler et al. | |
| D. 250,422 | 11/1978 | Mallison. | |
| 1,446,740 | 2/1923 | Eummelen | 119/18 |
| 2,839,027 | 6/1958 | Lanza | 119/26 |
| 3,554,165 | 1/1971 | Carter | 119/18 |
| 3,707,949 | 1/1973 | Lippi | 119/18 |
| 4,284,036 | 8/1981 | Hostetler | 119/72.5 |
| 4,389,977 | 6/1983 | Borak | 119/72.5 |

FOREIGN PATENT DOCUMENTS 849845  8/1970  Canada ............................ 119/75

Primary Examiner—Gene Mancene
Assistant Examiner—Cary E. Stone

[57] ABSTRACT

A cage anchor is provided, for supporting a drinker unit, having a retaining portion which receives a plurality of wire elements, these wire elements forming a portion of the poultry case enclosure, and retains these wire elements in a cooperating orientation so as to restrict motion of the drinker unit with respect to the cage enclosure. The retaining portion includes U-shaped slots for receiving at least two mutually intersecting wire elements. One of these wire elements is retained in its respective slot by a blocking pin passing through the open end of that slot. The other wire elements is retained by the cooperation of opposing slots engaging different lengths.

33 Claims, 13 Drawing Figures

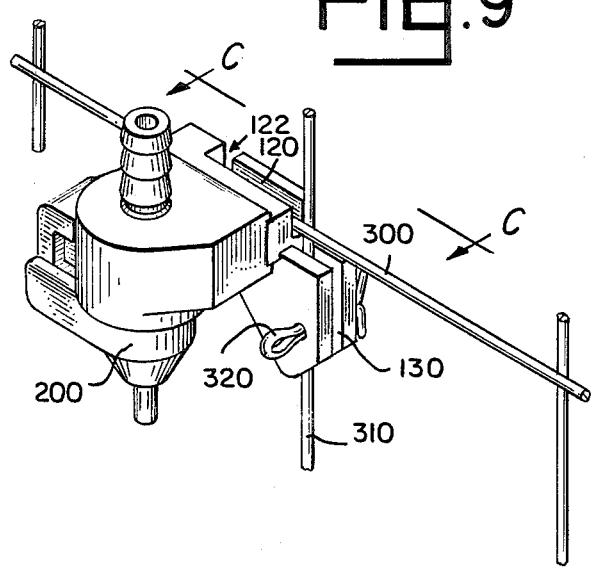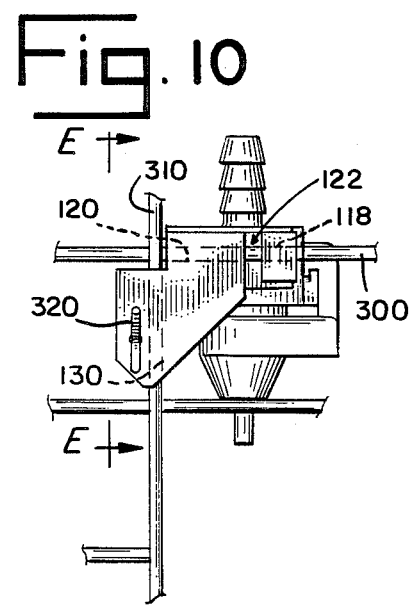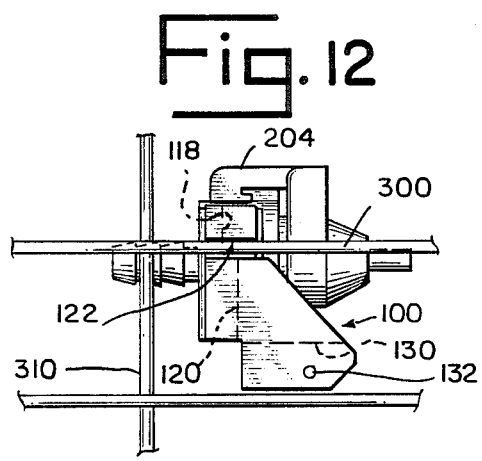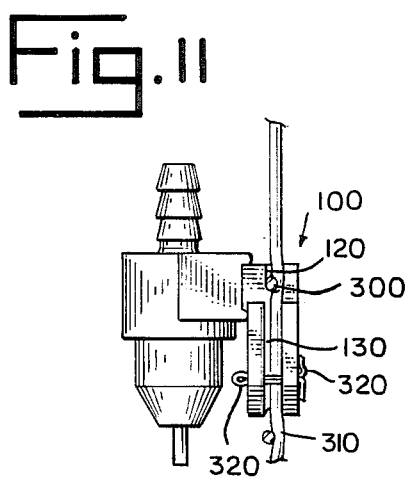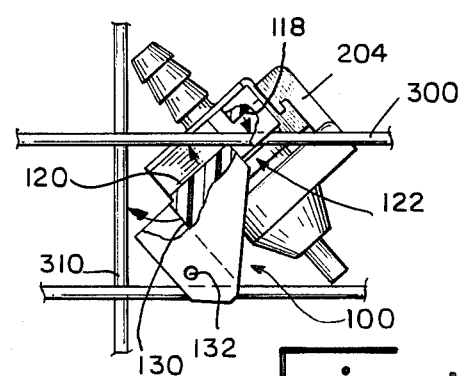

CAGE ANCHOR FOR WATERING DEVICE

BACKGROUND AND SUMMARY OF THE INVENTION

The present invention relates generally to watering devices for small animals or fowl and, more particularly, to devices for supporting drinker cups and/or drinker pins with respect to wire enclosures for fowl.

Small animals, fowl, and other livestock are typically raised or maintained individually or as small groups in wire enclosures or cages with food and water supplied directly to each cage. For example, in large scale poultry operations a number of cages may be arranged in batteries with water and feed conduits extending over the entire length of each battery, these conduits having one or more individual outlets for each cage. Various devices have been suggested in an attempt to provide a reliable supply of fresh water from the conduits to these outlets at all times.

It has been found to be desirable to permit the flow of fresh water from these outlets to be controllable by pecking action of the poultry themselves so that water is available whenever desired. At the same time, it is important to limit the excess flow of water beyond the chicken's actual needs and ability to consume so that water will not spill into the feed or accumulate beneath the cage. It is also desirable to limit the exposure of water to the atmosphere and aerobic contaminants so that it remains fresh. Likewise, the suitability of a particular watering device or drinker unit will also be a function of the number and size of the poultry in each cage. For example, cup drinkers having a given water volume that is satisfactory for adult hens may be inappropriate for small chicks.

Further, these factors are not static within a given poultry operation. At different poultry growth stages, different drinker units may be most efficient. Also, the operation may shift from one type of poultry to another using the same cage batteries. Further, drinker unit valves will, over time, wear out. Even where more expensive drinker units are available which have a greater useful lifetime with regard to wear, it is often desirable to frequently replace these units in the interests of sanitation. Thus, it is important that the drinker units be replaceable or interchangable with a minimum of cost and effort. For example, in one arrangement the primary fluid supply conduits overlay the poultry cages and flexible hoses provide a fluid connection between these conduits and each of the drinker units at the individual cages. As the poultry drinking requirements vary, or the drinker units wear out, it is more desirable to replace only the drinker units rather than the supply conduits and hoses as well.

While interchangeability of drinker units is important, it is also essential that the drinker units be secured to the individual cages to prevent relative movement there between even under frequent intermittent pecking forces. Otherwise as the poultry pecking action actuates the drinker valve, water may be spilled rather than consumed. Over time, such relative motion may cause excess wear and tear on the drinker unit and may force it into an orientation from which water is inaccessible to the poultry.

Another consideration in constructing and mass producing commercially marketable devices for releasably anchoring drinker units to poultry cages is that the poultry cages themselves are not necessarily of standardized construction and dimensions. This is especially true in cases where new drinker units are to be retrofit onto existing cage batteries. Other factors arise from the tremendous number of cages and drinker units involved in typical poultry operations: the drinker units and anchoring devices should be relatively inexpensive and easy to install in order to achieve widespread acceptance in the industry. It is also desirable to provide drinker units which may be adjusted to different heights on the cage to accommodate different size poultry.

It is, therefore, an object of the present invention to provide an improved watering device arrangement with respect to enclosures for animals and poultry.

Another object is the provision of a cage anchor device for poultry drinker units which may be easily and securely attached to wire enclosures.

A further object is to provide an inexpensive means of releasably securing replaceable drinker units onto poultry cages.

Still another object is the provision of a commercially feasible device for releasably anchoring poultry drinker units in a variety of different orientations with respect to a wire enclosure.

These and other objects of the present invention are attained in the provision of a cage anchor, for supporting a drinker unit, having a retaining portion which receives a plurality of wire elements, these wire elements forming a portion of the poultry case enclosure, and retains these wire elements in a cooperating orientation so as to restrict motion of the drinker unit with respect to the cage enclosure. The retaining portion includes U-shaped slots for receiving at least two mutually intersecting wire elements. One of these wire elements is retained in its respective slot by a blocking pin passing through the open end of that slot. The other of the wire elements is retained by the cooperation of opposing slots engaging different lengths thereof.

The cage anchor also includes a fluid connection between the water supply line and the valved portion of the drinker unit. The drinker unit is secured to the cage anchor by rotatably interconnected hooks having engagement assisting ramps thereon. The drinker unit may have a fully contained valve unit therein or may employ a portion of the cage anchor as part of the valve housing. Either trigger pin or cup-type drinker units may be attached to the cage anchor of the present invention.

The cage anchor is moldable from plastic materials and/or may have portions ultrasonically welded thereto. The slot orientations in the retaining portion permit easy attachment to the cage enclosure and in a variety of different positions. At the same time the structural integrity and attachment will remain secure even under frequent intermittent pecking of large poultry.

Other objects, advantages and novel features of the present invention will become apparent from the following description of the preferred embodiments when taken in conjunction with the accompanying drawings.

BRIEF DESCRIPTION OF THE DRAWINGS

FIG. 9 shows a rear-bottom perspective view of a cage anchor according to the present invention as securing a trigger pin-type watering device to a wire cage.

FIG. 10 shows a side view of the cage anchor arrangement of FIG. 9 as taken along line C—C of that Figure.

FIG. 11 shows a rear view of the cage anchor arrangement of FIG. 9 as taken along line E—E of FIG. 10.

FIG. 12 shows a side view of the cage anchor arrangement of FIG. 9 corresponding to the view of FIG. 10 where the cage anchor is initially positioned to receive wire elements of the cage.

FIG. 13 shows a partial cross-sectional side view of the cage anchor arrangement of FIG. 9 corresponding to the view of FIG. 10 where the cage anchor is rotated to receive a wire element of the cage.

DESCRIPTION OF THE PREFERRED EMBODIMENTS

Figure 1:
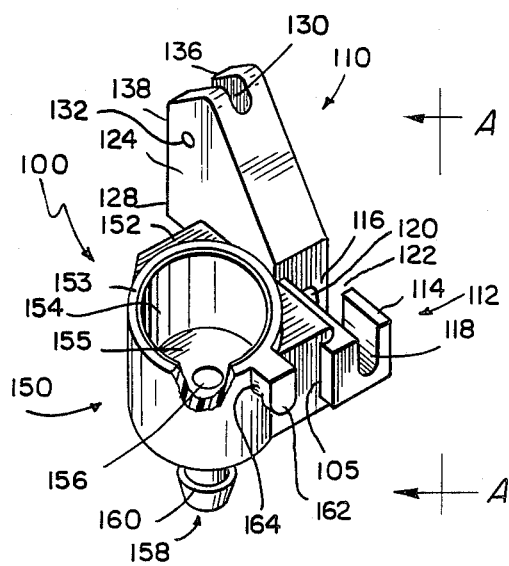
FIG. 1 shows a front-top perspective view of a cage anchor constructed according to the principles of the present invention without a watering device retained therein.

FIG. 1, which illustrates a preferred emboidment of the present invention, shows a cage anchor 100 without a watering device attached thereto. Cage anchor 100 includes a wire retaining portion 110 and a watering device supporting portion 150. Portions 110 and 150 are, for example, separately molded from plastic material and then ultrasonically bonded together along edge 105.

Figure 2:
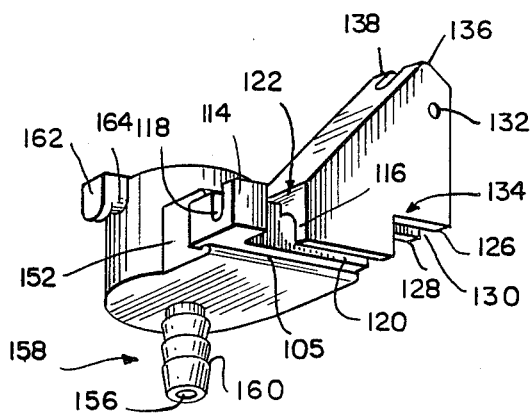
FIG. 2 shows a side-bottom perspective view of the cage anchor of FIG. 1 as viewed from line A—A of that figure.

Wire retaining portion 110 includes a base 112 extending along the side of portion 150 at edge 105. Base 112 is formed with arms 114 and 116 extending therefrom to create U-shaped slots 118 and 120 with respect to base 112. As shown in FIGS. 1 and 2, slot 118 is upwardly open and slot 120 is downwardly open. A gap 122 of a predetermined width separates arms 114 and 116. Arm 116 includes an upward and rearward extension 124 with rearward projections 126 and 128 thereof forming U-shaped slot 130. This slot is shown as vertically extending in FIGS. 1 and 2.

Projections 126 and 128 are formed with aligned channels 132 extending therethrough. With respect to base 112 and arm 116, projections 126 and 128 form a notch 134 at one end where slots 120 and 130 would otherwise intersect. At their other ends, projections 126 and 128 are cut away to form inclined edges 136 and 138.

The dimensions of slots 118, 120 and 130 are such that they are capable of receiving and partially enclosing the wire elements forming at least a portion of the cage or enclosure with which cage anchor 100 will be used. Similarly, the dimensions of gap 122 are such that the wire element received by slots 118 and 120 is also received in gap 122 and freely movable therein, as discussed further below. The dimensions and alignment of channels 132 are such that a blocking element (not shown), such as a cotter pin, may be inserted through both channels simultaneously. The location of channels 132 with respect to slot 130 and the edges of projections 126 and 128 is such that when a wire element is received within slot 130 and the blocking element is inserted within channels 132, the blocking element prevents removal of the wire element from slot 130.

Supporting portion 150 includes a base 152 extending along the side of retaining portion 110 at edge 105. Recess 154 is preferably integrally formed in base 152 and is dimensioned so as to receive a portion of the watering device to be secured by cage anchor 100. As will be discussed further below, a variety of different watering devices are available for mounting within recess 154. Recess 154 includes an upper shoulder 153 extending from the top surface of base 152. From bottom surface 155 of recess 154, a passageway 156 extends through stem 158. The exterior surface of stem 158 is formed as a ferrule 160 to facilitate sealing attachment to a flexible hose member extending from a water supply conduit (not shown). Thus, passageway 156 serves to provide a fluid connection between the watering device and the flexible hose. While surface 160 is illustrated as a ferrule, the present invention specifically contemplates that various other stem configurations are available to provide a mechanically secure and fluid tight connection with respect to a branch of the water supply conduit.

Base 152 is also provided with at least one hook element 162 for securing the watering device to cage anchor 100. A mating hook element is provided on the watering device, and when the watering device is inserted within recess 154, these hook elements are rotatably interlocked. Hook element 162 includes ramp portions 164 thereon which assist in the locking engagement of the hook elements. Ramp portions are preferably also formed on the watering device hook element and include curved or inclined surfaces at the side edges of the hook elements. Additional details concerning hook elements contemplated by the present invention are illustrated in U.S. Pat. No. 4,284,036 and co-pending U.S. patent application Ser. No. 631,623, filed on July 16, 1984.

Figure 3:
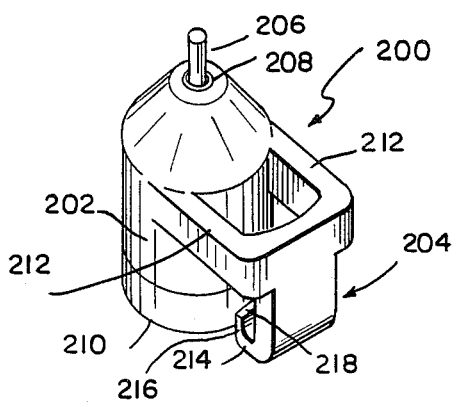
FIG. 3 shows a side perspective view of a drinker unit suitable for use with the cage anchor of FIG. 1 according to the principles of the present invention.
Figure 4:
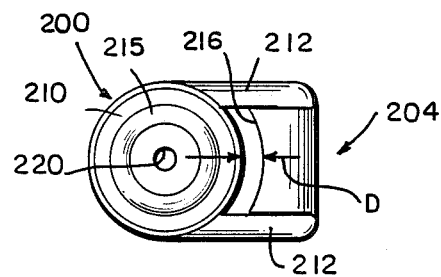
FIG. 4 shows a bottom view of the drinker unit of FIG. 3.
Figure 5:
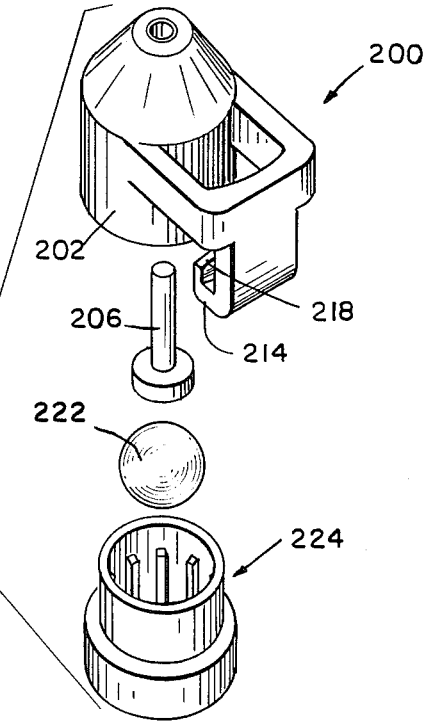
FIG. 5 shows a partially exploded view of the drinker unit of FIG. 3.

As mentioned above, the present invention contemplates that various different watering devices may be interchangeably employed with the cage anchor. FIGS. 3, 4 and 5 illustrate one such watering device, in this case a trigger pin-type drinker unit 200, which is receivable by cage anchor 100 of FIGS. 1 and 2. This drinker unit includes a self-contained valve housing 202 and a hook element 204 extending therefrom. A portion of trigger pin 206 extends outward from one end of valve housing 202 through valve outlet 208. At another end, valve housing 202 is provided with a bottom surface 210 having valve inlet 220 therein and an in-line O-ring 215 encircling valve inlet 220. Drinker unit 200 is telescopically inserted into recess 154 such that bottom surface 210 of drinker unit 200 engages or is adjacent bottom surface 155 of recess 154. In-line O-ring 215 is mounted in bottom surface 210 so as to provide a fluid-tight seal at the connection of passageway 156 and valve inlet 220.

This fluid connection is secured under restraining pressure from the interconnection of hook elements 162 and 204. The latter hook element is spaced away from the surface of valve housing 202 by arms 212 for a distance D corresponding substantially to the thickness of shoulder 153. Hook element 204 includes an end portion 214 which is configured so as to matingly receive hook elements 162 therein. End portion 214 has radiussed surface 216 which is contoured to permit rotatable and sliding movement of drinker unit 200 with respect to base 152 and shoulder 153 when inserted into recess 154. End portion 214 also has ramp portions 218 thereon to assist in locking engagement of the hook elements, as described above. With the hook element arrangement thus described, various different watering devices can be removably secured to the cage anchor.

Hook element 204 and valve housing 202 may be integrally formed from molded plastic materials. The internal valve components of drinker unit 200 include trigger pin 206, valve ball 222, and a valve seat construction (not shown). A preferred valve seat construction for use in the present invention is shown and described in the above-mentioned U.S. Patent and copending Patent Application. The valve seal construction is disposed within housing 222 adjacent valve outlet 208. Trigger pin 206 is inserted through the valve seat construction and out of valve outlet 208. Valve ball 222 rests on a curved surface on the head of trigger pin 206, and either or both of valve ball 222 or trigger pin 206 (at its head) is in sealing engagement with the valve seat construction when the valve is not actuated. The valve preferably is biased into this sealing relationship by the force of water pressure alone on valve ball 222, although in some embodiments springs are employed. Bottom cap 224 is telescopically fit into valve housing 202 and maintains the valve components within the valve housing.

Figure 6:
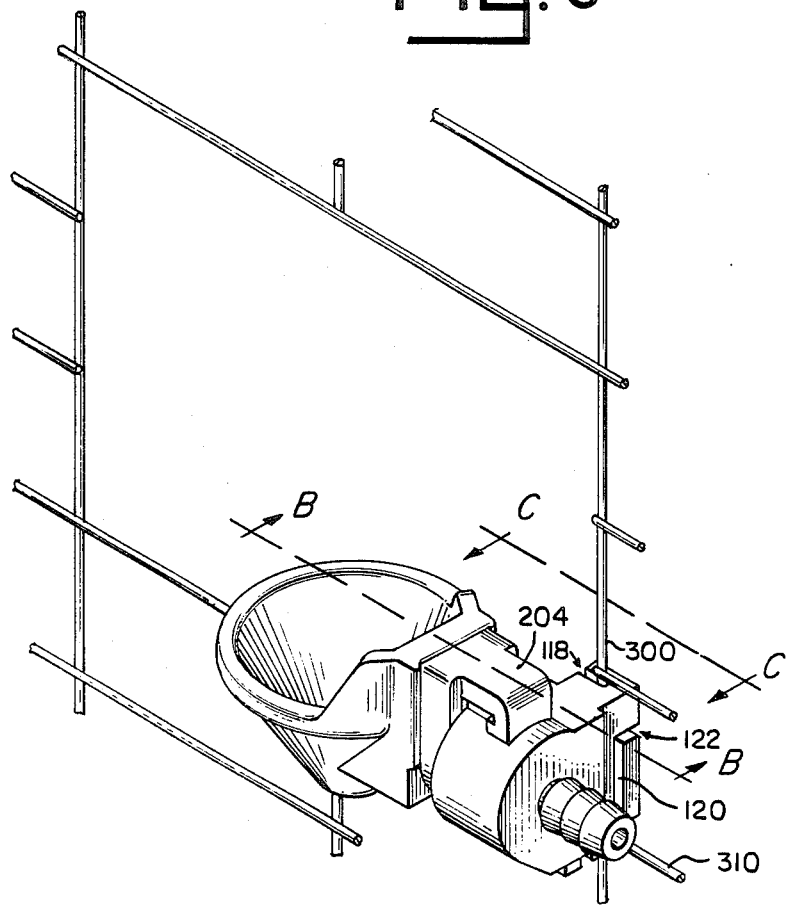
FIG. 6 shows a rear-side perspective view of a cage anchor according to the present invention as securing a cup-type watering device to a wire cage.
Figure 7:
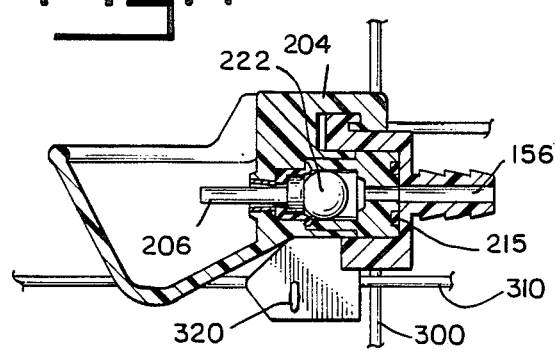
FIG. 7 shows a partial cross-sectional side view of the cage anchor arrangement of FIG. 6 as taken along line B—B of that Figure.
Figure 8:
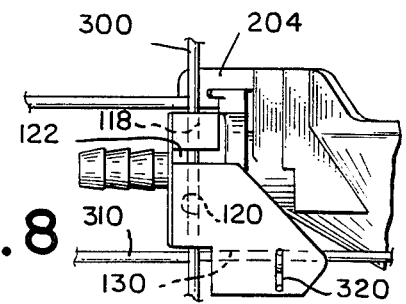
FIG. 8 shows a partial side view of the cage anchor arrangement of FIG. 6 as taken along line C—C of that Figure.

The valve of drinker unit 200 is actuatable to permit water to flow therethrough when, for example, poultry peck at trigger pin 206 and cause it to move laterally or vertically. To provide a cup-type watering device, drinker unit 200 is, for example, formed with a cup-like cavity extending past valve outlet 208 to retain water therein (shown generally in FIGS. 6-8). No additional features are typically required in the means of connecting such a watering device to the cage anchor aside from those elements shown with drinker unit 200. Further, as will now be readily understood by those skilled in the art, shoulder 153 can also be dimensioned and extended so that it forms a portion of the valve housing for the drinker unit. More specifically, a narrowed shoulder 153 can be telescopically inserted into valve housing 202 as a substitute for bottom cap 224.

The cage anchor of the present invention is particularly useful to rigidly secure watering devices with respect to cages or enclosures formed from mutually intersecting individual wire elements. FIGS. 6-8 and 9-11 show embodiments of the present invention in conjunction with a cup-type and trigger pin-type drinker units, respectively, as mounted on such a cage. As shown therein, slots 118 and 120 receive wire element 300 from opposing sides and at different locations along its length, separated by gap 122. Thus, slots 118 and 120 prevent movement of cage anchor 100, and watering devices attached rigidly thereto, in response to forces acting in vertical directions. Slots 130 receive wire element 310, and blocking elements 320, passing through channels 132, prevent removal of wire element 310 from slots 130. Thus, horizontal, sliding or rotational motion about wire element 300 is also prevented, resulting in secure placement of the drinker unit with respect to the cage.

As shown in FIGS. 12 and 13, wire element 300 is received in slots 118 and 120 by initially positioning that wire element in gap 122 transverse to the direction of slots 118 and 120. Cage anchor 100 is then rotated clockwise, as shown in FIG. 13, to position slots 118 and 120 about wire element 300 by pivoting on an edge or side of gap 122. Once wire element 122 is received within slots 118 and 120, cage anchor 100 is slid toward wire element 310 so that it is then received in slot 130. Alternatively, wire element 310 may be aligned and received into slot 130 simultaneously with rotation of cage anchor 100 to receive wire element 300 in slots 118 and 120. When wire element 310 is received in slot 130, blocking element 320 is inserted through channels 132 to prevent withdrawal of wire element 310 from slot 130. At least at this point, cage anchor 100 is securely and immovably fastened to the cage.

Although the present invention has been described in terms of detailed preferred embodiments, it is to be understood that this description is to be taken by way of illustration and example only, and not by way of limitation. For example, other alternative shapes and structures are contemplated by the assembly of the present invention. Accordingly, the spirit and scope of the present invention are to be limited only by the terms of the appended claims.

What is claimed is:

1. Means for supporting a watering device about first and second intersecting wire elements on an enclosure formed from a plurality of intersecting wire elements, comprising:
    a retaining portion for receiving said first and second intersecting wire elements, said retaining portion including first wire engaging means for engaging said first wire element and second wire engaging means for engaging said second wire element, said second wire engaging means having at least two spaced apart slots with oppositely disposed openings for receiving said second wire element, said wire elements being received by said first and second wire engaging means in a cooperating manner with respect to said retaining portion so as to restrict motion of said watering device with respect to said enclosure.

2. The support means according to claim 1 wherein said watering device includes a watering cup actuatable by animals or fowl within said enclosure.

3. The support means according to claim 1 wherein said watering device includes a self-contained drinker unit removably retained by said support means.

4. The support means according to claim 1 wherein said watering device includes a valve housing with a valved actuating member therein responsive to contact by an animal or fowl within said enclosure, and said support means forms a portion of said valve housing for said valved actuating member.

5. The support means according to claim 4 wherein said watering device includes a drinker unit forming the remainder of said valve housing, and said drinker unit is sealingly received by said support means.

6. The support means according to claim 1 wherein said means for receiving said wire elements includes a plurality of slots in said retaining portion, and each of said slots matingly receives at least one of said wire elements.

7. The support means according to claim 1 wherein said watering device includes a drinker means, and said drinker means and said support means include hook elements for interengagement to secure said drinker means to said support means.

8. The support means according to claim 7 wherein said hook elements include ramp portions thereon to assist in said engagement with respect to said support means and said drinker means.

9. The support means according to claim 7 wherein said hook elements are rotatably interengaged so as to secure said drinker means to said support means.

10. The support means according to claim 1 wherein said support means includes means for interconnecting said waterind device and a fluid supply means.

11. The support means according to claim 1 wherein retaining portion includes U-shaped slot means for engaging said wire elements therein and means for blocking the removal of at least a first of said wire elements from the open end of said U-shaped slot means once said first wire element is inserted therein.

12. The support means according to claim 11 wherein said retaining portion further includes cooperating slot means for engaging at least a second of said wire elements from opposing sides thereof.

13. The support means according to claim 1 wherein said support means is formed form molded plastic.

14. Support means according to claim 1, wherein said first wire engaging means engages said first wire element on only one side of said second wire element, and said second wire engaging means engages second wire element on only one side of said first wire element.

15. Support means for supporting a watering device about first and second intersecting wire elements on an enclosure formed from a plurality of intersecting wire elements, comprising:
   a retaining portion for receiving said first and second intersecting wire elements,
   said retaining portion including first wire engaging means for engaging said first wire element and second wire engaging means for engaging said second wire element,
   said wire elements being received in a cooperating manner with respect to said retaing portion so as to restrict motion of said watering device with respect to said enclosure, and
   said retaining portion receiving at least said first wire element from opposing sides over different lengths of said first wire element.

16. A cage anchor means for immovably securing a watering device to a wire enclosure for poultry and small animals comprising:
   a retaining portion having slot means for receiving first and second mutually intersecting wire elements forming said wire enclosure in a cooperating manner such that said cage anchor is fixed with respect to said wire enclosure, said retaining portion including first and second wire engaging surface means, said first surface means engaging only said first wire element and said second surface means engaging only said second wire element; and
   a support portion, fixed to said retaining portion, for securing said watering device to said cage anchor, including recess means for telescopically receiving said watering device and rotatably interlocking hook means engaging mating hook means on said watering device to releasably secure said watering device with respect to said cage anchor.

17. Support means for supporting a watering device about first and second intersecting wire elements on an enclosure formed from a plurality of intersecting wire elements, comprising:
   a retaining portion for receiving said first and second intersecting wire elements, said retaining portion including first wire engaging means for engaging said first wire element and second wire engaging means for engaging said second wire element, said wire elements being received in a cooperating manner with respect to said retaining portion so as to restrict motion of said watering device with respect to said enclosure, said watering device including a valve housing with a valved actuating member therein responsive to contact by an animal or fowl within said enclosure, and said support means forming a portion of said valve housing.

18. The support means according to claim 17 wherein said watering device includes a drinker unit forming the remainder of said valve housing, and said drinker unit is sealingly received by said support means.

19. Support means for supporting a watering device about first and second intersecting wire elements on an enclosure formed from a plurality of intersecting wire elements, comprising:
   a retaining portion means for receiving said first and second intersecting wire elements, said retaining portion including first wire engaging means for engaging said first wire element and second wire engaging means for engaging said second wire element, said wire elements being received in a cooperating manner with respect to said retaining portion so as to restrict motion of said watering device with respect to said enclosure, said means for receiving said wire elements including a plurality of slots in said retaining portion, and each of said slots matingly receiving at least one of said wire elements.

20. Support means for supporting a watering device about first and second intersecting wire elements on an enclosure formed from a plurality of intersecting wire elements, comprising:
   a retaining portion for receiving said first and second intersecting wire elements, said retaining portion including first wire engaging means for engaging said first wire element and second wire engaging means for engaging said second wire element, said wire elements being received in a cooperating manner with respect to said retaining portion so as to restrict motion of said watering device with respect to said enclosure, said watering device including a drinker means, and said drinker means and said support means including hook elements for interengagement to secure said drinker means to said support means.

21. The support means according to claim 20 wherein said hook elements include ramp portions thereon to assist in said engagement with respect to said support means and said drinker means.

22. The support means according to claim 20 wherein said hook elements are rotatably interengaged so as to secure said drinker means to said support means.

23. Support means for supporting a watering device about first and second intersecting wire elements on an enclosure formed from a plurality of intersecting wire elements, comprising:
   a retaining portion for receiving said first and second intersecting wire elements, said retaining portion including first wire engaging means for engaging said first wire element and second wire engaging means for engaging said second wire element, said wire elements being received in a cooperating manner with respect to said retaining portion so as to restrict motion of said watering device with respect to said enclosure, and said support means including means for interconnecting said watering device and a fluid supply means.

24. Support means for supporting a watering device about first and second intersecting wire elements on an enclosure formed from a plurality of intersecting wire elements, comprising:

a retaining portion for receiving said first and second intersecting wire elements, said retaining portion including first wire engaging means for engaging said first wire element and second wire engaging means for engaging said second wire element, said wire elements being received in a cooperating manner with respect to said retaining portion so as to restrict motion of said watering device with respect to said enclosure, and said first wire engaging means including U-shaped slot means for engaging said wire elements therein and means for blocking the removal of at least said first wire element from an open end of said U-shaped slot means once said first wire element is inserted therein.

25. The support means according to claim 24 wherein said second wire engaging means includes cooperating slot means for engaging at leaast said second wire element from opposing sides of said second wire element.

26. Means for supporting a poultry watering device about first and second intersecting wire elements, comprising:

a retaining portion having base and side regions;

said base region including first and second slots for receiving said first wire element;

said side region including a third slot for receiving said second wire element;

said first slot being spaced apart from said second slot and opening in a direction opposite to and away from the opening of said second slot; and said first, second and third slots being cooperatively disposed with respect to the intersection of said wire elements such that said first and second wire elements are received by said slots in a manner which restricts motion of said watering device with respect to said wire elements.

27. The means for supporting a poultry watering device according to claim 26 wherein said retaining portion includes blocking means arranged to traverse said third slot to prevent removal of said second wire element when said second wire element is received in said third slot.

28. The means for supporting a poultry watering device according to claim 27 wherein said first slot is spaced apart from said second slot by a distance at least as large as the thickness of said first wire element.

29. The means for supporting a poultry watering device according to claim 28 wherein said first, second, and third slots each have a generally U-shaped cross sectional configuration with predetermined longitudinal lengths, wherein said first and second wire elements are substantially orthogonally intersecting, wherein the lengths of said first and second slots are aligned along said first wire element when said first wire element is inserted therein, and wherein the length of said second slot is substantially orthogonally aligned with respect to the length of said third slot.

30. An attachment apparatus for securement to first and second intersecting wires, comprising:

a base portion having first and second slots for receiving said first wire, said first slot having an upward opening and said second slot having a downward opening, a gap portion between said first and second slots having a width greater than the thickness of said first wire, a side portion having a third slot for receiving said second wire, blocking means for preventing removal of said second wire from said third slot, and said first and second slots being aligned with said third slot such that when said first wire is received within said first and second slots and said second wire is received within said third slot motion of said apparatus with respect to said wires is restricted.

31. A method of attaching a watering device for poultry or small animals to first and second wires of a wire enclosure, said watering device including a base portion with first and second slots for receiving said first wire and a gap between said first and second slots having a width greater than the thickness of said first wire, a side portion with a third slot for receiving said second wire, and a retaining device for preventing removal of said second wire from said third slot, and said first slot having an opening in a direction opposite to and away from the opening of said second slot and said third slot having an opening angularly disposed with respect to the openings of said first and second slots, comprising:

first, disposing said base portion such that said first wire is received within said gap;

next, rotating said base portion with respect to said first wire such that said first wire is received within said first slot and said second slot;

then, sliding said side portion toward said second wire such that said second wire is received within said third slot; and and then, applying said retaining device so as to prevent removal of said second wire from said third slot.

32. A cage anchoring device for connection to first and second wires, comprising:

a base portion having first and second slots with a gap portion therebetween;

said first and second slots each having a length with a generally U-shaped cross-sectional configuration;

said first and second slots having alignment along their lengths and each having openings for receiving said first wire;

the opening of said first slot facing away from the opening of said second slot;

said gap portion having a width larger than the thickness of said first wire;

a side portion having a third slot with an opening for receiving said second wire;

means connected to said side portion for retaining said second wire within said third slot;

said third slot having a length with a generally U-shaped cross sectional configuration; and the length of said third slot being disposed at an angle with respect to said alignment of the lengths of said first and second slots.

33. Support means for connecting a poultry watering device to a cage having at least two intersecting wires, comprising:

- a retaining means having a base portion and a side portion,
- said base portion including a first retaining slot and a second retaining slot for engaging said first wire,
- said side portion including a third retaining slot for engaging said second wire,
- said first and second slots of said base portion opening in opposite directions,
- a fourth opening angularly positioned to both said first and second slots in said base portion thereby separating said first and second slot and providing an inserting means to allow said first wire to engage said first and second slots by rotating said support means about said first wire,
- a second retaining means associated with said third slot for retaining said second wire in said third slot,
- said first and second retaining means cooperatively disposed to restrict motion of said watering device with respect to said cage.

* * * * *

UNITED STATES PATENT AND TRADEMARK OFFICE
CERTIFICATE OF CORRECTION

PATENT NO. : 4,709,658
DATED : December 1, 1987
INVENTOR(S) : Eldon Hostetler

It is certified that error appears in the above-identified patent and that said Letters Patent is hereby corrected as shown below:

In Column 7, line 15, please delete "waterind" and insert therefor -- watering --.

In Column 7, line 27, please delete "form" and insert therefor -- from --.

In Column 7, line 44, please delete "retaing" and insert thereof -- retaining --.

Signed and Sealed this

First Day of November, 1988

Attest:

DONALD J. QUIGG

Attesting Officer

Commissioner of Patents and Trademarks